(12) United States Patent
Katz et al.

(10) Patent No.: US 10,864,477 B2
(45) Date of Patent: Dec. 15, 2020

(54) METHOD FOR SEPARATING C5-C8 HYDROCARBONS AND ACID GASES FROM A FLUID STREAM

(71) Applicant: BASF SE, Ludwigshafen am Rhein (DE)

(72) Inventors: Torsten Katz, Neustadt (DE); Ralf Notz, Maxdorf (DE); Andreas Kern, Discovery Bay (HK)

(73) Assignee: BASF SE, Ludwigshafen am Rhein (DE)

( * ) Notice: Subject to any disclaimer, the term of this patent is extended or adjusted under 35 U.S.C. 154(b) by 203 days.

(21) Appl. No.: 16/073,840

(22) PCT Filed: Feb. 2, 2017

(86) PCT No.: PCT/EP2017/052304
§ 371 (c)(1),
(2) Date: Jul. 30, 2018

(87) PCT Pub. No.: WO2017/137309
PCT Pub. Date: Aug. 17, 2017

(65) Prior Publication Data
US 2019/0039013 A1  Feb. 7, 2019

(30) Foreign Application Priority Data

Feb. 8, 2016 (EP) .................................. 16154722
Apr. 8, 2016 (EP) .................................. 16164431

(51) Int. Cl.
*B01D 53/14* (2006.01)
*C10L 3/10* (2006.01)

(52) U.S. Cl.
CPC ..... *B01D 53/1425* (2013.01); *B01D 53/1418* (2013.01); *B01D 53/1456* (2013.01);
(Continued)

(58) Field of Classification Search
CPC ............ B01D 53/1418; B01D 53/1425; B01D 53/1456–1481; B01D 53/1487; B01D 53/1493; B01D 2257/7027
See application file for complete search history.

(56) References Cited

U.S. PATENT DOCUMENTS 4,184,855 A   1/1980  Butwell et al.
6,607,585 B2  8/2003  Morrow
(Continued)

FOREIGN PATENT DOCUMENTS

WO   WO 2014/199036 A2   12/2014
WO   WO 2015/173263 A1   11/2015

OTHER PUBLICATIONS

U.S. Appl. No. 15/506,451, filed Feb. 24, 2017, US 2018-0221811 A1, G. Vorberg, et al.
(Continued)

*Primary Examiner* — Renee Robinson
(74) *Attorney, Agent, or Firm* — Oblon, McClelland, Maier & Neustadt, L.L.P.

(57) ABSTRACT

A process for removing $C_5$-$C_8$-hydrocarbons and acid gases from a fluid stream is described, where a) the fluid stream is brought into contact with an absorption medium comprising at least one amine in an absorption zone to obtain a deacidified fluid stream and an acid-gases-laden absorption medium, b) the laden absorption medium is heated in a first heat exchanger and decompressed into a decompression zone to a pressure of from 5 to 10 bar to obtain a $C_5$-$C_8$-hydrocarbons-comprising gas phase and a hydrocarbon-depleted laden absorption medium, c) the hydrocarbon-depleted laden absorption medium is heated in an optional second heat exchanger and passed into a stripper in which at a pressure of 1 to 2.5 bar the acid gases are at least partially liberated by supplying heat to obtain a regenerated absorp-
(Continued)

tion medium and an acid-gas-comprising stream, and d) the regenerated absorption medium is recycled into the absorption zone.

14 Claims, 4 Drawing Sheets

(52) U.S. Cl.
CPC .......... *B01D 53/1487* (2013.01); *C10L 3/101* (2013.01); *B01D 2252/204* (2013.01); *B01D 2252/20421* (2013.01); *B01D 2252/20426* (2013.01); *B01D 2252/20431* (2013.01); *B01D 2257/7027* (2013.01); *C10L 2290/06* (2013.01); *C10L 2290/10* (2013.01); *C10L 2290/541* (2013.01); *C10L 2290/545* (2013.01)

(56) References Cited

U.S. PATENT DOCUMENTS

| | | |
|---|---|---|
| 2002/0012622 A1 | 1/2002 | Frondorf |
| 2014/0065040 A1 | 3/2014 | Katz et al. |
| 2016/0144314 A1* | 5/2016 | Gonnard .............. E21B 43/40 95/174 |
| 2017/0100694 A1 | 4/2017 | Delfort et al. |

OTHER PUBLICATIONS

U.S. Appl. No. 15/506,635, filed Feb. 24, 2017, US 2017-0282115 A1, T. Ingram, et al.
U.S. Appl. No. 15/506,646, filed Feb. 24, 2017, US 2017-0282116 A1, T. Ingram, et al.
U.S. Appl. No. 15/764,138, filed Mar. 28, 2018, US 2018-0272271 A1, T. Ingram, et al.
U.S. Appl. No. 15/763,604, filed Mar. 27, 2018, G. Vorberg, et al.
Keith A. Bullin, et al., "Optimizing Methanol Usage for Hydrate Inhibition in a Gas Gathering System", $83^{rd}$ Annual Convention of the Gas Processors Association, Mar. 2004, 10 pages.
Gavin D. McIntyre, et al., "Recent GPA Data Improves BTEX Predictions for Amine Sweetening Facilities", $80^{th}$ Gas Processors Association Annual Convention, Mar. 2001, 18 pages.
International Search Report dated May 17, 2017, in PCT/EP2017/052304, filed Feb. 2, 2017.

\* cited by examiner

METHOD FOR SEPARATING C5-C8 HYDROCARBONS AND ACID GASES FROM A FLUID STREAM

CROSS REFERENCE TO RELATED APPLICATIONS

This application claims is a national stage application of the International application PCT/EP2017/052304, filed Feb. 2, 2017, which claims priority to European application EP16154722.9, filed Feb. 8, 2016 and European application EP 16164431.5, filed Apr. 8, 2016.

BACKGROUND OF THE INVENTION

Field of Invention

The present invention relates to a process for removing $C_5$-$C_8$-hydrocarbons and acid gases from a fluid stream.

Discussion of the Background

Numerous fluid streams contain acid gases, for example $CO_2$, $H_2S$, $SO_2$, $CS_2$, HCN, COS or mercaptans. These fluid streams may be, for example, gas streams such as natural gas, refinery gas or synthesis gas. Removal of the acid gases from these fluid streams is desirable for various reasons.

The content of acid gases in natural gas is reduced through suitable treatment measures directly at the natural gas source, since said gases form corrosive acids in the water frequently entrained in the natural gas.

Synthesis gas is composed essentially of carbon monoxide and hydrogen. Synthesis gas is generally produced by partial oxidation or steam reforming of hydrocarbons. The raw synthesis gas comprises acid gases such as carbon dioxide, hydrogen sulfide or carbonyl sulfide which need to be removed.

On an industrial scale, removal of acid gases, such as carbon dioxide, from fluid streams is often achieved using aqueous solutions of organic bases, for example amines such as alkanolamines in particular, as absorption media. Dissolution of acid gases causes ionic products to be formed from the base and the acid gas constituents. The absorption medium may be regenerated by heating, decompression to a lower pressure, or stripping, the ionic products undergoing back reaction to form acid gases and/or the acid gases being stripped off by steam. The absorption medium may be reused after the regeneration process.

The absorption medium often absorbs not only the acid gases but also other nonacid, low-boiling compounds present in the fluid stream, for example methane or ethane. Said compounds are bound less strongly than acid gases in the aqueous amine solutions used as absorption medium since they do not form ionic products with amines. Typically, non-acid, low-boiling compounds such as methane or ethane are selectively desorbed in a decompression stage upstream of the regenerator.

Some fluid streams also comprise higher-boiling hydrocarbons, in particular $C_5$-$C_8$-hydrocarbons including benzene, toluene, ethylbenzene and xylenes (BTEX). These too may be at least partly absorbed into the absorption medium. Said hydrocarbons are desorbed only to a small extent, if at all, in a conventional decompression stage upstream of the regenerator on account of their relatively high boiling points compared to methane or ethane. A significant portion of the $C_5$-$C_8$-hydrocarbons issues from the absorption medium only upon the desorption of the acid gases effected in the regenerator. Thus at least a portion of the higher-boiling hydrocarbons having a boiling point above that of ethane is lost via the exiting acid gas stream or else additional outlay for the recovery thereof is incurred. A portion of these higher-boiling hydrocarbons is highly hazardous to health; this applies in particular to benzene and other aromatic hydrocarbons, such as toluene, ethylbenzene or xylene. The contamination of the acid gas stream with these hydrocarbons is to be kept as low as possible. The $C_5$-$C_8$-hydrocarbons result in undesired foaming in the regeneration step. BTEX hydrocarbons act as solubilizers for higher hydrocarbons and exacerbate the foaming problems.

Attempts have been made in the past to desorb $C_5$-$C_8$-hydrocarbons absorbed in the absorption medium separately from the acid gases, for instance in U.S. Pat. No. 6,607,585 B2. Described therein is a gas scrubbing process which reduces the content of benzene, toluene, ethylbenzene and xylenes (BTEX) and of volatile aliphatic hydrocarbons (VOC) in the removed acid gas. This is achieved by stripping these hydrocarbons out of the $CO_2$- and $H_2S$-laden aqueous amine solution in a BTEX stripper and incinerating them before introduction of said solution into the regenerator.

The process of U.S. Pat. No. 6,607,585 B2 has disadvantages. Firstly it requires an additional stripper for removing the BTEX and VOC. Additionally, to strip out BTEX and VOC a portion of the product of value (deacidified natural gas) obtained at the top of the absorber/of the downstream scrubbing unit is passed into the BTEX stripper. In addition, a portion of the regenerated amine solution obtained from the regenerator is passed into the BTEX stripper to ensure backwashing with stripped-out acid gas. Thus, reducing the BTEX and VOC content in the acid gas requires one additional stripper and two additional streams and the conduits etc. necessary therefor. The removal of BTEX in the process of U.S. Pat. No. 6,607,585 B2 thus creates significant additional outlay.

US 2002/0012622 A1 describes a process for removing VOC from an amine-comprising absorption medium used for deacidification of acid-gas-containing gas streams. This comprises passing the laden absorption medium into a flash tank. The flash tank is operated selectively such that VOC, but only very small amounts of $CO_2$, are liberated therein. Thus the pressure in the flash tank is, for example, 4.5 bar (64.7 psia) and the temperature is 87.2° C. (189° F.).

In the proceedings of the 83rd Gas Processors Association Annual Convention (Mar. 14-17, 2004) under the title "Hydrocarbons and BTEX Pickup and Control from Amine Systems" Bullin and Brown describe the simulation of a process in which laden 50% methyldiethanolamine is initially passed through a "rich flash", then through a heat exchanger and subsequently through a "hot flash". Heat from the regenerated absorption medium is transferred to the laden absorption medium in the heat exchanger. The "hot flash" is evidently operated at low pressure since benzene is liberated from the absorption medium from as low as 65.6° C. (150° F.). The "hot flash" moreover cannot be employed efficiently for the removal of BTEX since it liberates not only benzene but also large amounts of $CO_2$. Mcintyre et al. describe a similar simulation in the proceedings of the 80th Gas Processors Association Annual Convention (Mar. 12-14, 2001) under the title "Recent GPA Data Improves BTEX Predictions for Amine Sweetening Facilities".

WO 2014/199036 teaches gently heating a $CO_2$-laden absorption solution—after optional decompression into a medium-pressure flash tank—and then decompressing said solution into a low-pressure flash tank so that a gaseous hydrocarbon-containing fraction (inter alia BTEX) is liberated and a hydrocarbon-depleted absorption solution is obtained. The apparatus for heating is, for example, a heat exchanger with a hot operating medium. The low-pressure flash tank is operated at, for example, 1.5 bar.

One disadvantage of the process of WO 2014/199036 is that the liberated hydrocarbons are generated at a low pressure and cannot readily be fed into a fuel gas system. The liberated hydrocarbons are difficult to utilize in a useful fashion; they are incinerated with addition of fuel. In addition, sufficient removal of BTEX requires significant engineering and/or energy outlay. If the smallest possible amount of energy is to be supplied for the gentle heating of the $CO_2$-laden absorption solution, sufficient liberation of BTEX requires a large low-pressure flash tank with a large number of theoretical plates. Only then can supplying a small amount of heat result in liberation of a sufficiently large portion of the BTEX present in the absorption medium. If, by contrast, it is sought to minimize the engineering outlay by using a smaller low-pressure flash tank, sufficient separation performance is possible only to the detriment of the energy balance. This is because the laden absorption medium must then be passed into the low-pressure flash tank at a higher temperature. This in turn requires stronger heating of the $CO_2$-laden absorption solution.

BRIEF DESCRIPTION OF THE FIGURES

The invention is more particularly elucidated by the appended drawings and the examples which follow.

DETAILED DESCRIPTION OF THE INVENTION

Figure 1:
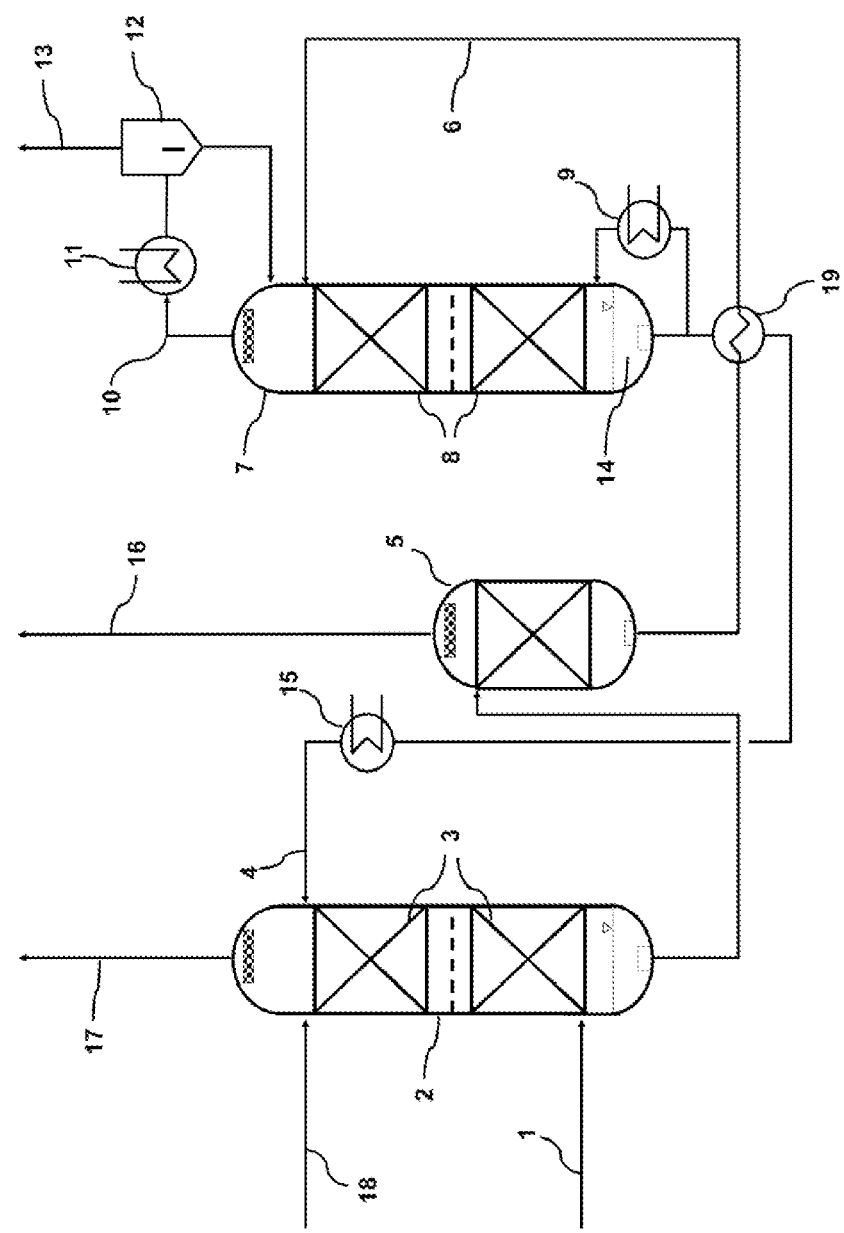
FIG. 1 is a schematic diagram of a plant comprising only the second heat exchanger for performing a noninventive process.

The present invention has for its object the provision of a process for removing acid gases from a $C_5$-$C_8$-hydrocarbons-comprising fluid stream where the $C_5$-$C_8$-hydrocarbons are generated in an easily utilizable form, separately from the acid gases, with minimal engineering and energy outlay.

This object is achieved by a process for removing $C_5$-$C_8$-hydrocarbons and acid gases from a fluid stream, wherein
a) the fluid stream is brought into contact with an absorption medium comprising at least one amine in an absorption zone to obtain a deacidified fluid stream and an acid-gases-laden absorption medium,
b) the laden absorption medium is heated in a first heat exchanger and decompressed into a decompression zone to a pressure of from 5 to 10 bar to obtain a $C_5$-$C_8$-hydrocarbons-comprising gas phase and a hydrocarbon-depleted laden absorption medium,
c) the hydrocarbon-depleted laden absorption medium is passed into a stripper in which at a pressure of 1 to 2.5 bar the acid gases are at least partially liberated by supplying heat to obtain a regenerated absorption medium and an acid-gas-comprising stream, the hydrocarbon-depleted laden absorption medium optionally being heated in a second heat exchanger before being introduced into the stripper, and
d) the regenerated absorption medium is recycled into the absorption zone,
wherein,
if the second heat exchanger is present, the heating medium used in the second heat exchanger is the regenerated absorption medium and the heating medium used in the first heat exchanger is the regenerated absorption medium after it has passed through the second heat exchanger, or, if the second heat exchanger is not present, the heating medium used in the first heat exchanger is the regenerated absorption medium,
and
the amount of heat transferred in the first heat exchanger is such that the $C_5$-$C_8$-hydrocarbons-comprising gas phase comprises 50% to 97% by volume of acid gases, preferably 70% to 95% by volume of acid gases, for example 80% to 95% by volume of acid gases.

Thus, if the second heat exchanger is present, the heating medium used in the second heat exchanger is the regenerated absorption medium and the heating medium used in the first heat exchanger is the regenerated absorption medium after it has passed through the second heat exchanger. The relative amounts of heat transferred in the first heat exchanger and in the second heat exchanger are then weighted such that the $C_5$-$C_8$-hydrocarbons-comprising gas phase comprises 50% to 97% by volume of acid gases, preferably 70% to 95% by volume of acid gases, for example 80% to 95% by volume of acid gases.

Alternatively, if the second heat exchanger is not present, the heating medium used in the first heat exchanger is the regenerated absorption medium. The amount of heat transferred in the first heat exchanger is then such that the $C_5$-$C_8$-hydrocarbons-comprising gas phase comprises 50% to 97% by volume of acid gases, preferably 70% to 95% by volume of acid gases, for example 80% to 95% by volume of acid gases.

The heat exchange between the regenerated absorption medium and the laden absorption medium takes place in two stages in a first heat exchanger and in a second heat exchanger or in just one stage if the second heat exchanger is not present. The first heat exchange is effected before the decompression of the laden absorption medium into the decompression zone; the second heat exchange is used in order to heat the hydrocarbon-depleted laden absorption medium after leaving a desorption zone, in which a portion of the acid gases is liberated by further decompression, and before entry thereof into the stripper. The heating medium used in the second heat exchanger is the regenerated absorption medium and the heating medium used in the first heat exchanger is the regenerated absorption medium after it has passed through the second heat exchanger, if the second heat exchanger is present. If it is not present, then the heating medium used in the first heat exchanger is the regenerated absorption medium. This achieves an optimal heat integration for the process.

In specific embodiments of the process, the relative amounts of heat transferred in the first heat exchanger and in the second heat exchanger would be weighted such that the amount of heat in the first heat exchanger, which is by far predominant, is transferred. In the borderline case, the second heat exchanger becomes obsolete.

The relative amounts of heat transferred in the heat exchangers are weighted such that the gas phase in the decompression zone which comprises the $C_5$-$C_8$-hydrocarbons contains a relatively high proportion of acid gases. If the second heat exchanger is not present, the amount of heat transferred in the first heat exchanger is such that the gas phase in the decompression zone which comprises the $C_5$-$C_8$-hydrocarbons contains a relatively high proportion of acid gases. The relatively high proportion of acid gases is deliberately accepted since this dilutes the $C_5$-$C_8$-hydrocarbons in the gas phase and reduces the partial pressure thereof. This shifts the distribution equilibrium of the $C_5$-$C_8$-hydrocarbons in the direction of the gas phase which in turn favors transferral of further $C_5$-$C_8$-hydrocarbons into the gas phase.

In the process according to the invention the $C_5$-$C_8$-hydrocarbons are generated with minimal engineering outlay. The additional outlay entailed by the removal of BTEX in the process of U.S. Pat. No. 6,607,585 B2 is avoided. In particular, liberation of the $C_5$-$C_8$ hydrocarbons requires neither product of value (deacidified natural gas) nor regenerated amine solution obtained from the regenerator/the desorption zone.

The $C_5$-$C_8$-hydrocarbons are generated with minimal energy outlay. In contrast to WO 2014/199036 external heat is supplied to the absorption medium only in the stripper while the heat required for the liberation in the decompression zone is provided exclusively via (internal) heat exchange.

The $C_5$-$C_8$-hydrocarbons are generated in an easily utilizable form. Since the $C_5$-$C_8$-hydrocarbons-comprising gas phase is obtained at a pressure of from 5 to 10 bar, no additional compression outlay is required to supply said phase to the fuel gas system. A fuel gas system is normally operated at a pressure of at least 6 bar.

The fluid stream is brought into contact with an absorption medium comprising at least one amine in an absorption zone. The fluid stream is preferably brought into contact with the absorption medium in the absorption zone at a pressure of 30 to 120 bar, in particular of 50 to 80 bar. This affords an at least partially deacidified fluid stream (referred to herein as deacidified fluid stream) and an acid-gases-laden absorption medium.

The treatment of the fluid stream with the absorption medium is preferably effected in countercurrent. The fluid stream is thus generally fed into a lower region, and the absorption medium into an upper region, of the absorption zone. Above the absorption zone the absorption medium may be distributed over the cross section of the absorption zone via suitable liquid distributors. To improve contact and provide a large mass transfer interface the absorption zone generally comprises internals, for example random packings, structured packings and/or trays. The treatment of the fluid stream with the absorption medium is suitably effected in an absorption tower/absorption column, for example a random-packed, structured-packed or tray column. The absorption zone is deemed to be the section of an absorption column in which the fluid stream comes into mass transfer contact with the absorption medium.

The temperature of the absorption medium introduced into the absorption zone is generally about 20 to 60° C.

The deacidified fluid stream may be brought into contact with an aqueous liquid. This can serve to scrub out entrained absorption medium constituents and/or to equalize the water balance of the process when more water is discharged via the exiting streams than is introduced via the entering streams.

The aqueous liquid may be an intrinsic liquid, i.e. an aqueous liquid generated at another point in the process, or an aqueous liquid supplied from an external source. The aqueous liquid preferably comprises a condensate formed during a downstream cooling of the deacidified fluid stream (so-called absorber top condensate) or a condensate formed during cooling of the acid-gas-comprising stream (so-called acid gas condensate) and/or fresh water.

The aqueous liquid may, for example, be fed into an upper region of the absorption zone.

Alternatively, the aqueous liquid may be fed into an optional scrubbing zone. The scrubbing liquid is run in countercurrent to the deacidified fluid stream in the scrubbing zone. The scrubbing zone preferably comprises random packings, structured packings and/or trays to intensify the contact between the fluid stream and the scrubbing liquid. Above the scrubbing zone the scrubbing liquid may be distributed over the cross section of the scrubbing zone via suitable liquid distributors.

The scrubbing zone may be configured as a section of an absorption column arranged above the absorption zone. To achieve this the scrubbing zone is a sector of the absorption column configured as a backwashing section or rectifying section disposed above the absorption medium feed.

The scrubbing liquid may be recycled via the scrubbing zone. This is achieved by collecting the scrubbing liquid below the scrubbing zone, for example by means of a suitable collection tray, and, via a pump, pumping it to the upper end of the scrubbing zone. The recycled scrubbing liquid may be cooled, preferably to a temperature of from 20° C. to 70° C., in particular 30° C. to 60° C. This is advantageously achieved by recirculating the scrubbing liquid through a cooler. To avoid an accumulation of scrubbed-out absorption medium constituents in the scrubbing liquid a substream of the scrubbing liquid is discharged from the scrubbing zone.

The laden absorption medium is heated in a first heat exchanger. The laden absorption medium is heated by indirect heat exchange in the heat exchanger. The process according to the invention may employ any form of indirect heat exchanger suitable for transferring heat from one liquid to another liquid as the first heat exchanger. In the first heat exchanger the laden absorption medium is heated to a temperature in the range from 85° C. to 105° C. for example.

It is possible to partially decompress the acid-gases-laden absorption medium even before or during entry into the first heat exchanger. The advantage of this is that the heat exchanger need not be configured to withstand the high pressure at which the acid-gases-laden absorption medium is formed in the absorption zone. The acid-gases-laden absorption medium is preferably decompressed at most to an extent such that it does not require active conveying, such as pumping for example, before entry into the decompression zone.

The laden absorption medium heated in the first heat exchanger is decompressed into a decompression zone to a pressure of 5 to 10 bar, preferably to a pressure of >6 to 10 bar.

The decompression zone may, for example, be integrated into a flash tank in which the laden absorption medium is decompressed.

Decompression of the laden absorption medium heated in the first heat exchanger affords a $C_5$-$C_8$-hydrocarbons-comprising gas phase and a hydrocarbon-depleted laden absorption medium. Coabsorbed constituents of the fluid stream, such as inert gases, oxygen and/or hydrocarbons, such as $C_5$-$C_8$-hydrocarbons in particular, are liberated. A small portion of the acid gases is also liberated; the $C_5$-$C_8$-hydrocarbons-comprising gas phase comprises 50% to 97% by volume of acid gases. However, the main amount of the acid gases is not liberated in the decompression zone.

The $C_5$-$C_8$-hydrocarbons-comprising gas phase effluxes from the decompression zone in an upward direction. It is preferable to withdraw the $C_5$-$C_8$-hydrocarbons-comprising gas phase via a conduit attached to the top of the flash tank.

The hydrocarbon-depleted laden absorption medium drains out of the decompression zone in a downward direction. Said medium is preferably discharged via a conduit attached to the bottom of the flash tank.

The obtained hydrocarbon-depleted laden absorption medium is, for example, sent directly to the optional second heat exchanger or initially decompressed further.

In a preferred embodiment, the regeneration of the hydrocarbon-depleted laden absorption medium comprises a decompression step in which a portion of the acid gases is liberated by further decompression, an intermediate heating operation in the second heat exchanger and complete regeneration in the stripper. To this end, before the heating in the second heat exchanger the hydrocarbon-depleted laden absorption medium is decompressed into a desorption zone to a pressure of 1 to 2.5 bar and preheated therein by direct heat exchange with the acid-gas-comprising stream.

The desorption zone may, for example, be integrated into a low-pressure flash tank into which the hydrocarbon-depleted laden absorption medium is decompressed. It is preferable when the acid-gas-comprising stream is introduced into the low-pressure flash tank below the desorption zone and the hydrocarbon-depleted laden absorption medium is introduced into the low-pressure flash tank above the desorption zone.

The desorption zone may also be integrated into the stripper.

This preferred embodiment offers the advantage of an additional surprising reduction in energy requirements which is evidenced by the following examples.

The hydrocarbon-depleted laden absorption medium is heated in a second heat exchanger. The laden absorption medium is heated by indirect heat exchange in the heat exchanger. The process according to the invention may employ any form of indirect heat exchanger suitable for transferring heat from one liquid to another liquid as the second heat exchanger.

The hydrocarbon-depleted laden absorption medium heated in the second heat exchanger is passed into a stripper.

If no second heat exchanger is present, the hydrocarbon-depleted laden absorption medium obtained in the decompression zone can be passed directly into the stripper.

In the stripper the acid gases are at least partially liberated at a pressure of 1 to 2.5 bar by supplying heat. This affords a regenerated absorption medium, which is recycled into the absorption zone, and an acid-gas-comprising stream.

The acid gases are generally liberated by heating the hydrocarbon-depleted laden absorption medium to 100° C. to 150° C., for example 100° C. to 140° C., in particular 105° C. to 135° C. This may be achieved by heating and partially evaporating the decompressed absorption medium via an evaporator in the lower part of the stripper.

The evaporator is preferably disposed outside the stripper. Absorption medium from the bottom is passed into the evaporator and at least the vapor formed in the evaporator is returned to the stripper.

The bottom of the stripper may be divided into an upper and a lower bottom compartment with a tray. In one embodiment absorption medium collecting on the tray is passed into the evaporator disposed outside the stripper and the vapor formed in the evaporator and the liquid absorption medium heated in the evaporator are passed into the lower bottom compartment.

The stripper generally has a regeneration zone disposed above the bottom. The heated hydrocarbon-depleted laden absorption medium is preferably introduced into the stripper above the regeneration zone. In the regeneration zone the vapor generated in the evaporator is run in countercurrent to the absorption medium flowing downward through the regeneration zone. The regenerated absorption medium is advantageously discharged from the bottom of the stripper.

If a second heat exchanger is present, in a preferred embodiment of the process according to the invention the hydrocarbon-depleted laden absorption medium decompressed into the desorption zone is preheated with the acid-gas-comprising stream, as intimated hereinabove. To this end, the acid-gas-comprising stream exiting the regeneration zone in an upward direction may be passed into the desorption zone.

This may be achieved in different ways. For example, the desorption zone may be disposed above the regeneration zone in the stripper, the acid-gas-comprising stream effluxing from the regeneration zone in an upward direction entering the desorption zone directly from below. Generally, the absorption medium exiting the desorption zone in a downward direction is then passed through the second heat exchanger into the regeneration zone. The absorption medium exiting the desorption zone in a downward direction is for example collected on a collection tray and discharged from the collection tray out of the stripper, through the second heat exchanger and then back into the stripper below the collection tray.

The desorption zone may also be integrated into a low-pressure flash tank spaced apart from the stripper, the acid-gas-comprising stream being discharged at the top of the stripper and introduced into the low-pressure flash tank below the desorption zone.

The acid-gas-comprising stream may be passed through a rectifying zone after leaving the regeneration zone/after leaving the desorption zone in the case where a desorption zone is provided. For example, it is preferable for the rectifying zone to be disposed above the desorption zone in the stripper when the desorption zone is disposed in the stripper. By contrast, it is preferable for the rectifying zone to be disposed above the desorption zone in the low-pressure flash tank when the desorption zone is integrated into the low-pressure flash tank.

The rectifying zone suitably comprises a structured packing, a random packing and/or a plurality of trays.

The acid-gas-comprising stream is generally cooled to condense out an aqueous phase referred to herein as acid gas condensate. When a desorption zone is present cooling is preferably effected after the acid-gases-comprising stream has passed through the desorption zone. When a rectifying zone is present cooling is preferably effected after the acid-gas-comprising stream has passed through the rectifying zone. When both a desorption zone and a rectifying zone are present cooling is preferably effected after the acid-gases-comprising stream has passed through both zones. The acid gas condensate may be at least partially recycled into the rectifying zone, the desorption zone or the regeneration zone as reflux. The acid gas condensate may also be at least partially introduced into the absorption medium circuit, for example by introduction into an upper sector of the absorption zone or by using acid gas condensate as the aqueous liquid with which the deacidified fluid stream is brought into contact. It is also possible to discharge a portion of the acid gas condensate from the process. Discharging may be effected by means of a controllable reflux divider for example.

The regenerated absorption medium is used as heating medium in the second heat exchanger if the latter is present. The regenerated absorption medium discharged from the bottom of the stripper is then preferably passed directly into the second heat exchanger as heating medium.

The regenerated absorption medium obtained after passing through the second heat exchanger is in turn used as heating medium in the first heat exchanger, if the second heat exchanger is present. This is preferably achieved by passing the regenerated absorption medium issuing from the second heat exchanger directly into the first heat exchanger. If the second heat exchanger is not present the regenerated absorption medium discharged from the stripper is passed into the first heat exchanger.

According to the invention the $C_5$-$C_8$-hydrocarbons-comprising gas phase comprises 50% to 97% by volume of acid gases. To this end, sufficient heat is transferred in the first heat exchanger or the relative amounts of heat transferred in the first heat exchanger and in the second heat exchanger are appropriately weighted.

Those skilled in the art will appreciate that the acid gases are ionically and thus more securely bound in the amine-containing and thus basic absorption medium than coabsorbed constituents, such as inert gases, oxygen and/or hydrocarbons. Thus, if only very little heat is transferred in the first heat exchanger this results in a failure to meet the lower limit of 50% by volume of acid gases in the $C_5$-$C_8$-hydrocarbons-comprising gas phase because then essentially only loosely bound coabsorbed constituents, such as inert gases, oxygen and/or hydrocarbons, are desorbed. By contrast, if a great deal of heat is transferred in the first heat exchanger this results in the upper limit of 97% by volume of acid gases in the $C_5$-$C_8$-hydrocarbons-comprising gas phase being exceeded because then not only the loosely bound coabsorbed constituents, such as inert gases, oxygen and/or hydrocarbons, but also large amounts of acid gases, are desorbed. Because of this relationship between the amount of heat transferred and the proportion of acid gases in the desorbed gas phase, which is familiar to those skilled in the art, the amounts of heat transferred in the first heat exchanger and optionally in the second heat exchanger may readily be adjusted.

The $C_5$-$C_8$-hydrocarbons-comprising gas phase preferably comprises 70% to 95% by volume of acid gases, for example 80% to 95% by volume of acid gases. However, a severe dilution of more than 95% by volume or in particular more than 97% by volume is undesirable since this limits the utility of the $C_5$-$C_8$-hydrocarbons-comprising gas phase. For example, a very high proportion of acid gases impedes operation of the fuel gas system with the hydrocarbons present in the gas phase.

In one embodiment of the process according to the invention the $C_5$-$C_8$-hydrocarbons are at least partially condensed out of the $C_5$-$C_8$-hydrocarbons-comprising gas phase and the uncondensed constituents are passed into the absorption zone. The $C_5$-$C_8$-hydrocarbons-comprising gas phase may be passed through a cooler in which a $C_5$-$C_8$-hydrocarbons-comprising condensate is formed. The $C_5$-$C_8$-hydrocarbons-comprising condensate may be removed from the uncondensed constituents in a phase separation vessel and the uncondensed constituents passed into the absorption zone.

The absorption medium comprises at least one amine. The following amines are preferred:

(i) amines of formula I:

$$NR^1(R^2)_2 \qquad (I)$$

where $R^1$ is selected from $C_2$-$C_6$-hydroxyalkyl groups, $C_1$-$C_6$-alkoxy-$C_2$-$C_6$-alkyl groups, hydroxy-$C_1$-$C_6$-alkoxy-$C_2$-$C_6$-alkyl groups and 1-piperazinyl-$C_2$-$C_6$-alkyl groups and $R^2$ is independently selected from H, $C_1$-$C_6$-alkyl groups and $C_2$-$C_6$-hydroxyalkyl groups;

(ii) amines of formula II:

$$R^3R^4N\text{—}X\text{—}NR^5R^6 \qquad (II)$$

where $R^3$, $R^4$, $R^5$ and $R^6$ are independently of one another selected from H, $C_1$-$C_6$-alkyl groups, $C_2$-$C_6$-hydroxyalkyl groups, $C_1$-$C_6$-alkoxy-$C_2$-$C_6$-alkyl groups and $C_2$-$C_6$-aminoalkyl groups and X represents a $C_2$-$C_6$-alkylene group, —$X^1$—$NR^7$—$X^2$— or —$X^1$—O—$X^2$—, where $X^1$ and $X^2$ independently of one another represent $C_2$-$C_6$-alkylene groups and $R^7$ represents H, a $C_1$-$C_6$-alkyl group, $C_2$-$C_6$-hydroxyalkyl group or $C_2$-$C_6$-aminoalkyl group;

(iii) 5- to 7-membered saturated heterocycles which have at least one nitrogen atom in the ring and may comprise one or two further heteroatoms selected from nitrogen and oxygen in the ring, and (iv) mixtures thereof.

Specific examples are:
(i) 2-aminoethanol (monoethanolamine), 2-(methylamino) ethanol, 2-(ethylamino)ethanol, 2-(n-butylamino)ethanol, 2-amino-2-methylpropanol, N-(2-aminoethyl)piperazine, methyldiethanolamine, ethyldiethanolamine, dimethylaminopropanol, t-butylaminoethoxyethanol, 2-amino-2-methylpropanol;
(ii) 3-methylaminopropylamine, ethylenediamine, diethylenetriamine, triethylenetetramine, 2,2-dimethyl-1,3-diaminopropane, hexamethylenediamine, 1,4-diaminobutane, 3,3-iminobispropylamine, tris(2-aminoethyl)amine, bis(3-dimethylaminopropyl)amine, tetramethylhexamethylenediamine;
(iii) piperazine, 2-methylpiperazine, N-methylpiperazine, 1-hydroxyethylpiperazine, 1,4-bishydroxyethylpiperazine, 4-hydroxyethylpiperidine, homopiperazine, piperidine, 2-hydroxyethylpiperidine and morpholine; and
(iv) mixtures thereof.

In a preferred embodiment the absorption medium comprises at least one of the amines monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA) or mixtures thereof.

The amine is preferably a sterically hindered amine or a tertiary amine. A sterically hindered amine is a secondary amine in which the amine nitrogen is bonded to at least one secondary carbon atom and/or at least one tertiary carbon atom; or a primary amine in which the amine nitrogen is bonded to a tertiary carbon atom. One preferred sterically hindered amine is t-butylaminoethoxyethanol. One preferred tertiary amine is methyldiethanolamine.

When the amine is a sterically hindered amine or a tertiary amine the absorption medium preferably further comprises an activator. The activator is generally a sterically unhindered primary or secondary amine. In these sterically unhindered amines the amine nitrogen of at least one amino group is bonded only to primary carbon atoms and hydrogen atoms.

The sterically unhindered primary or secondary amine is, for example, selected from
alkanolamines, such as monoethanolamine (MEA), diethanolamine (DEA), ethylaminoethanol, 1-amino-2-methylpropan-2-ol, 2-amino-1-butanol, 2-(2-aminoethoxy)ethanol and 2-(2-aminoethoxy)ethanamine,
polyamines, such as hexamethylenediamine, 1,4-diaminobutane, 1,3-diaminopropane, 3-(methylamino)propylamine (MAPA), N-(2-hydroxyethyl)ethylenediamine, 3-(dimethylamino)propylamine (DMAPA), 3-(diethylamino)propylamine, N,N'-bis(2-hydroxyethyl)ethylenediamine,
5-, 6- or 7-membered saturated heterocycles which have at least one NH group in the ring and may comprise one or two further heteroatoms selected from nitrogen and oxygen in the ring, such as piperazine, 2-methylpiperazine, N-methylpiperazine, N-ethylpiperazine, N-(2-hydroxyethyl)piperazine, N-(2-aminoethyl)piperazine, homopiperazine, piperidine and morpholine.

Particular preference is given to 5-, 6- or 7-membered saturated heterocycles which have at least one NH group in the ring and may comprise one or two further heteroatoms selected from nitrogen and oxygen in the ring. Very particular preference is given to piperazine.

In one embodiment the absorption medium comprises methyldiethanolamine and piperazine.

The molar ratio of activator to sterically hindered amine or tertiary amine is preferably in the range from 0.05 to 1.0, particularly preferably in the range from 0.05 to 0.7.

The absorption medium generally comprises 10% to 60% by weight of amine.

The absorption medium is preferably aqueous.

The absorption medium may further comprise a physical solvent. Suitable physical solvents are, for example, N-methylpyrrolidone, tetramethylenesulfone, methanol, oligoethylene glycol dialkyl ethers such as oligoethylene glycol methyl isopropyl ether (SEPASOLV MPE), oligoethylene glycol dimethyl ether (SELEXOL). The physical solvent is generally present in the absorption medium in amounts of 1% to 60% by weight, preferably 10% to 50% by weight, in particular 20% to 40% by weight.

In a preferred embodiment the absorption medium comprises less than 10% by weight, for example less than 5% by weight, in particular less than 2% by weight of inorganic basic salts, such as potassium carbonate for example.

The absorption medium may also comprise additives, such as corrosion inhibitors, antioxidants, enzymes etc. In general, the amount of such additives is in the range of about 0.01-3% by weight of the absorption medium.

The process according to the invention is suitable for any fluid stream comprising $C_5$-$C_8$-hydrocarbons as well as acid gases. The supplied fluid stream is preferably selected from fluid streams comprising 0.01% to 30% by volume, in particular 0.5% to 10% by volume, of acid gases and 1 to 50 000 ppmv, in particular 10 to 5000 ppmv, of $C_5$-$C_8$-hydrocarbons.

The acid gases may comprise, for example, $CO_2$, $H_2S$, $SO_2$, $CS_2$, HCN, COS and mercaptans.

The removal of $C_5$-$C_8$-hydrocarbons selected from benzene, toluene, ethylbenzene and xylenes is particularly desirable since these aromatic hydrocarbons in particular are permitted to efflux into the atmosphere with acid gas streams, such as removed $CO_2$, only in limited quantities or costly and complex aftertreatments of the acid gas streams, for example incineration at high temperature, are required for BTEX removal. In addition, said hydrocarbons damage catalysts used for producing sulfur from removed $H_2S$-containing streams. The $C_5$-$C_8$-hydrocarbons to be removed in accordance with the process of the invention therefore preferably comprise aromatic hydrocarbons selected from benzene, toluene, ethylbenzene and xylenes.

The process according to the invention may be used to remove carbon monoxide, with or instead of the $C_5$-$C_8$-hydrocarbons-comprising gas phase, from carbon monoxide-containing fluid streams. The process according to the invention may thus also be used for removing carbon monoxide and acid gases from a fluid stream. The carbon monoxide then effluxes to a large extent via the gas phase obtained in the decompression zone since, like $C_5$-$C_8$-hydrocarbons, it is only physically dissolved in the absorption medium. The carbon monoxide content of the acid gases liberated in the stripper can then be reduced compared to prior art processes. The use of the process according to the invention for the (additional) removal of carbon monoxide is recommended in particular when acid gases are being separated from carbon-monoxide-rich fluid streams, for example synthesis gas. CO emission limits to be observed during liberation of the acid gas stream can then be more readily observed, i.e. optionally with reduced aftertreatment outlay.

The process according to the invention may be supplied with fluid streams at a wide range of different pressures. It is preferable when the supplied fluid stream has a pressure of 30 to 120 bar, in particular 50 to 80 bar.

The supplied fluid stream may be, for example, a gas such as natural gas, synthesis gas, coke oven gas, cracking gas, coal gasification gas, cycle gas, landfill gases and combustion gases or a liquid that is essentially immiscible with the absorption medium, such as LPG (liquefied petroleum gas) or NGL (natural gas liquids).

In preferred embodiments the supplied fluid stream is a
(i) hydrogen-comprising fluid stream; this includes synthesis gases producible, for example, by coal gasification or steam reforming which have optionally been subjected to a water-gas shift reaction; the synthesis gases are used, for example, for producing ammonia, methanol, formaldehyde, acetic acid, urea, for Fischer-Tropsch synthesis or for energy generation in an integrated gasification combined cycle (IGCC) process;
(ii) hydrocarbons-comprising fluid stream; this includes natural gas, offgases from various refinery processes, such as a tailgas unit (TGU), a visbreaker (VDU), a catalytic cracker (LRCUU/FCC), a hydrocracker (HCU), a hydrotreater (HDS/HTU), a coker (DCU), atmospheric distillation (CDU) or a liquid treater (for example LPG).

In a preferred embodiment of the process according to the invention the supplied fluid stream is natural gas.

In one embodiment the partial pressure of the acid gases in the supplied fluid stream is less than 3 bar, preferably less than 2 bar, in particular less than 1 bar.

The process according to the invention is particularly advantageous when the absorption zone is operated such that the temperature of the absorption medium passing through the absorption zone falls, remains constant or increases only to a small extent, for example by not more than 10 K or 5 K, in the absorption zone. It is preferable when the difference obtained by subtracting the temperature of the laden absorption medium discharged from the absorption zone from the temperature of the absorption medium introduced into the absorption zone is in the range from −25 K to +35 K, in particular in the range from −5 K to +20 K. The regenerated absorption medium issuing from the first heat exchanger then requires little or no cooling prior to recycling into the absorption zone since sufficient cooling is then already achieved in the first heat exchanger through the heat exchange with the laden absorption medium. The outlay of a further cooling is consequently largely or completely avoided. In this case in particular it is possible to transfer the overwhelming amount of heat in the first heat exchanger or to eschew the second heat exchanger. This is because there is then a need for stronger heating of the obtained cold, acid-gases-laden absorption medium.

Only with sufficiently strong heating of the laden absorption medium is a $C_5$-$C_8$-hydrocarbons-comprising gas phase having the required acid gas content obtained in the decompression zone at the pressure prescribed according to the invention.

The temperature of the absorption medium is influenced by several factors during passage through the absorption zone.

The supply of a cold fluid stream counteracts a severe heating of the absorption medium. The temperature of the supplied fluid stream is, for example, less than 70° C., in particular less than 50° C., for example 10° C. to 35° C.

A weak absorption medium stream (compared to the supplied fluid stream) also counteracts heating of the absorption medium. When the heat capacity stream of the absorption medium stream is lower than the heat capacity stream of the supplied fluid stream, the heat liberated during the exothermic absorption of the acid gases is removed from the absorption zone predominantly via the deacidified fluid stream. The quotient of the two heat capacity streams φ is therefore preferably less than 1, preferably less than 0.95, in particular less than 0.90, wherein φ is defined as $$\varphi = \frac{\dot{m}_a \cdot c_{pa}}{\dot{m}_f \cdot c_{pf}}$$

where $\dot{m}_a$ is the mass flow rate of the absorption medium passed into the absorption zone, $\dot{m}_f$ is the mass flow rate of the supplied fluid stream, $c_{pa}$ is the specific heat capacity of the absorption medium passed into the absorption zone, and $c_{pf}$ is the specific heat capacity of the supplied fluid stream.

A weak absorption medium stream compared to the supplied fluid stream ensures a sufficient removal of acid gases particularly when the volume fraction of the acid gases in the supplied fluid stream is small. In a preferred embodiment the volume fraction of the acid gases in the supplied fluid stream is less than 5% by volume, preferably less than 3.3% by volume, in particular less than 2.5% by volume, for example 0.1 to 2.5% by volume.

In a particularly preferred embodiment of the process according to the invention the temperature of the supplied fluid stream is less than 70° C., in particular less than 50° C., for example 10° C. to 35° C.; the volume fraction of the acid gases in the supplied fluid stream is less than 5% by volume, preferably less than 3.3% by volume, in particular less than 2.5% by volume, for example 0.1 to 2.5% by volume; and φ is less than 1, preferably less than 0.95, in particular less than 0.90.

In accordance with FIG. 1 a fluid stream 1 is passed into the lower part of an absorption column 2. The absorption column 2 comprises an absorption zone 3 which comprises two sectors arranged on top of one another and comprising packings. In the absorption zone 3 the fluid stream is brought into contact, in countercurrent, with an absorption medium which is introduced into the absorption column 2 via the conduit 4 above the absorption zone. The deacidified fluid stream is withdrawn via conduit 17. Fresh water is supplied via conduit 18.

The acid-gases-laden absorption medium is withdrawn at the bottom of the absorption column 2 and decompressed into the decompression zone of the flash tank 5 to a pressure of 5 to 10 bar via a throttle valve (not shown). The decompression results in desorption of coabsorbed constituents of the fluid stream and of a portion of the acid gases which are withdrawn via stream 16. The absorption medium decompressed to a pressure of 5 to 10 bar is passed via the heat exchanger 19 and conduit 6 into the stripper 7. The stripper 7 comprises a regeneration zone 8 which comprises two sectors arranged on top of one another and comprising packings. In the lower part of the stripper 7 the decompressed absorption medium is heated via the evaporator 9 and partially evaporated. The temperature increase liberates the absorbed acid gases. The acid-gases-comprising stream is discharged via the conduit 10 at the top of the stripper 7 and sent to the cooler 11. An acid gas condensate is obtained at the cooler 11, collected in the phase separation vessel 12 and recycled into the stripper. The acid gases are withdrawn as stream 13. The regenerated absorption medium 14 is recycled back into the absorption column 2 via the heat exchanger 19, cooler 15, a pump (not shown) and conduit 4.

Figure 2:
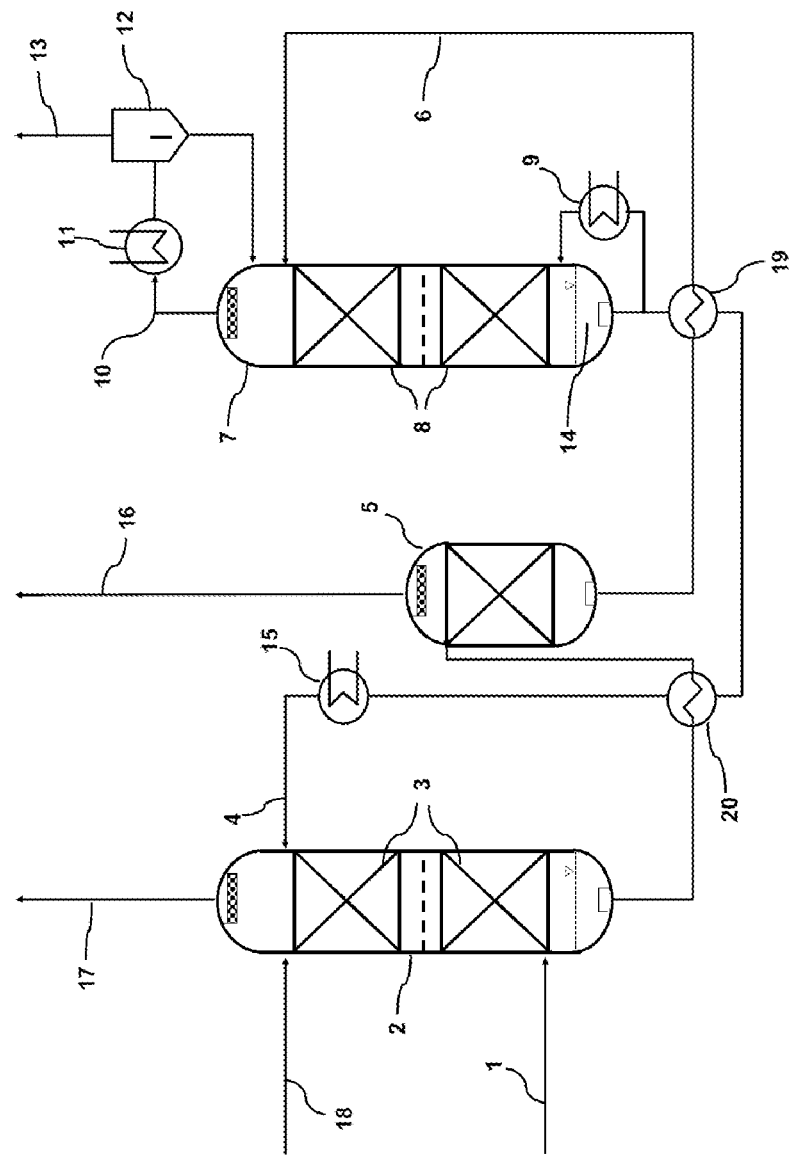
FIG. 2 is a schematic diagram of a plant comprising the first and the second heat exchanger for performing the inventive process.

FIG. 2 shows an inventive embodiment. The reference numerals in FIG. 2 have the same meanings as in FIG. 1. In contrast to FIG. 1, the acid-gases-laden absorption medium withdrawn at the bottom of the absorption column 2 is passed through a heat exchanger 20 and then decompressed into the decompression zone of the flash tank 5 to a pressure of 5 to 10 bar via the throttle valve (not shown). The regenerated absorption medium 14 is recycled back into the absorption column 2 via the heat exchanger 19, heat exchanger 20, cooler 15, a pump (not shown) and conduit 4.

Figure 3:
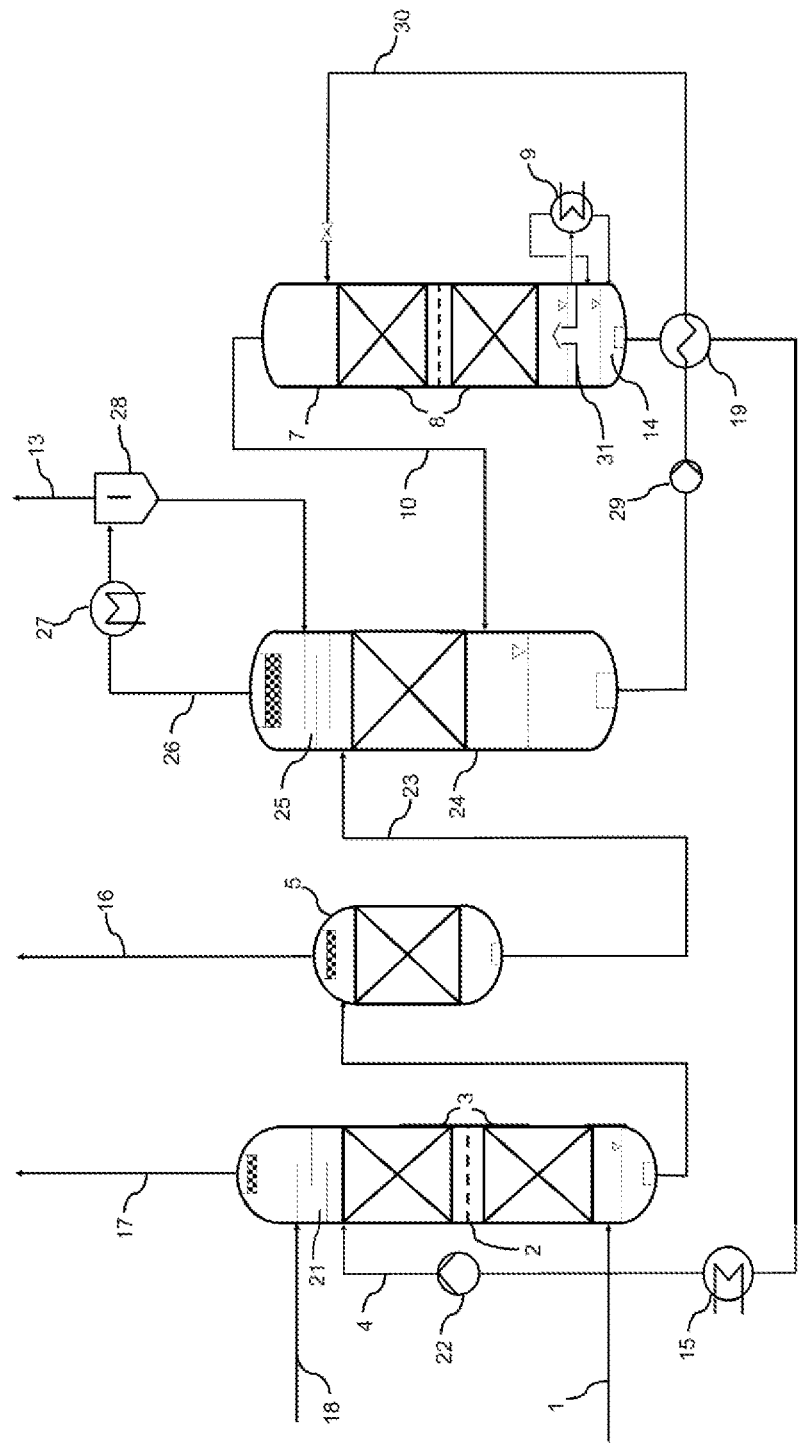
FIG. 3 is a schematic diagram of a plant comprising only one heat exchanger for performing a noninventive process where before warming in the second heat exchanger the hydrocarbon-depleted laden absorption medium is decompressed in a desorption zone to a pressure of 1 to 2.5 bar and preheated via direct heat exchange with the acid-gas-comprising stream. The heat exchanger of the process shown in FIG. 3 corresponds to the optional second heat exchanger of the process according to the invention.

The reference numerals in FIG. 3 have the same meanings as in FIG. 1. The absorption medium decompressed to a pressure of 5 to 10 bar is passed via conduit 23 into the low-pressure flash tank 24. Conduit 23 connects between the desorption zone disposed below it in the low-pressure flash tank and a rectifying zone 25 disposed above it in the low-pressure flash tank. The acid-gases-comprising stream is discharged via the conduit 10 at the top of the stripper 7 and sent to the low-pressure flash tank 24. Conduit 10 connects to the low-pressure flash tank 24 in the region between the bottom and the desorption zone. In the desorption zone the acid-gases-comprising stream supplied via conduit 10 is brought into contact, in countercurrent, with the absorption medium supplied via conduit 23. The acid-gases-comprising stream subsequently passes through the rectifying zone 25 and is discharged via conduit 26 at the top of the low-pressure flash tank 24 and sent to the cooler 27. An acid gas condensate is obtained at the cooler 27, collected in the phase separation vessel 28 and recycled into the low-pressure flash tank 24 in the region above the rectifying zone 25. The acid gases are withdrawn as stream 13.

The absorption medium decompressed to 1 to 2.5 bar is withdrawn, via a conduit, from the bottom of the low-pressure flash tank and passed into the stripper 7 with the aid of the optional pump 29 via the heat exchanger 19 and conduit 30. Below the regeneration zone 8 the absorption medium is collected on collecting tray 31, heated and partially evaporated via the evaporator 9 and passed into the bottom region below the collecting tray 31. The regenerated absorption medium 14 is recycled back into the absorption column 2 via the heat exchanger 19, cooler 15, pump 22 and conduit 4. The scrubbing zone 21 is disposed above the absorption zone 3 in the absorption column 2. Feeding of fresh water 18 is effected above the scrubbing zone 21.

Figure 4:
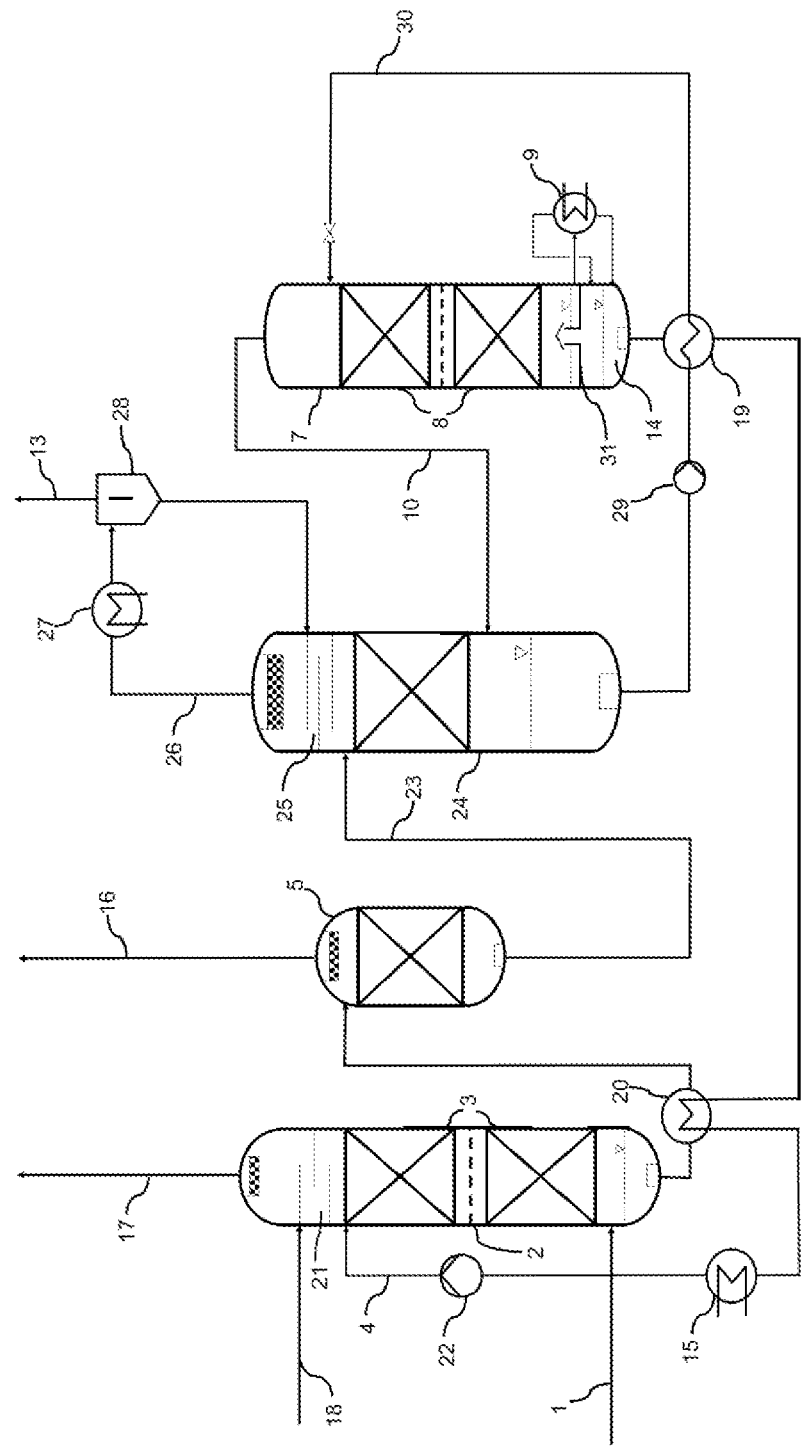
FIG. 4 is a schematic diagram of a plant comprising the first and the second heat exchanger for performing the inventive process where before heating in the second heat exchanger the hydrocarbon-depleted laden absorption medium is decompressed in a desorption zone to a pressure of 1 to 2.5 bar and preheated via direct heat exchange with the acid-gas-comprising stream.

FIG. 4 shows an inventive embodiment. The reference numerals in FIG. 4 have the same meanings as in FIGS. 1, 2 and 3. In contrast to FIG. 3, the acid-gases-laden absorption medium withdrawn at the bottom of the absorption column 2 is passed through a heat exchanger 20 and then decompressed into the flash tank 5 to a pressure of 5 to 10 bar via the throttle valve (not shown). The regenerated absorption medium 14 is recycled back into the absorption column 2 via the heat exchanger 19, heat exchanger 20, cooler 15, pump 22 and conduit 4.

EXAMPLES

General Information

The composition, flow rate, temperature and pressure of the fluid stream 1 for the examples which follow were:
2.0000% by volume $CO_2$
0.0004% by volume $H_2S$
1.0000% by volume $N_2$
92.9796% by volume $CH_4$
2.0000% by volume $C_2H_6$
1.0000% by volume $C_3H_8$
1.0000% by volume $C_6H_{14}$
0.0050% by volume benzene
0.0050% by volume toluene
0.0050% by volume ethylbenzene
0.0050% by volume o-xylene
Flow rate (dry): 500 000 $m^3(STP)/h$
Flow rate (water): 74 $m^3(STP)/h$
Flow rate (overall): 500 074 $m^3(STP)/h$
Flow rate (overall): 401 605 kg/h
Temperature: 30.0° C.
Pressure: 66.0 bar All pressures reported in the present document are absolute pressures.

In the present document "$m^3(STP)/h$" is the volume flow rate reported in standard cubic meters per hour. A standard cubic meter refers to a temperature of 273.15 K and a pressure of 1.01325 bar. All values reported in the unit % by volume also refer to these conditions.

The temperature of the deacidified (to a residual content of not more than 0.005% by volume of $CO_2$ in each case) fluid stream 17 was 56° C. in each case. The pressure of the deacidified fluid stream 17 was 65.9 bar in each case.

In all examples the absorption medium was an aqueous solution of 33.5% by weight of methyldiethanolamine and 6.5% by weight of piperazine in water. 247 t/h of absorption medium at a temperature of 40.0° C. were introduced into the absorption column 2 above the absorption zone via conduit 4. The temperature of the fresh water introduced via conduit 18 was likewise 40.0° C. The temperature of the acid-gases-laden absorption medium withdrawn at the bottom of the absorption column 2 was 35.4° C. in each case.

The examples are based on calculations performed using a simulation model. The phase equilibria were described using a model by Pitzer (K. S. Pitzer, Activity Coefficients in Electrolyte Solutions 2nd ed., CRC Press, 1991, Chapter 3, Ion Interaction Approach: Theory). The simulation of the absorption operations is described using a mass-transfer-based approach; details in this regard are described in Asprion (Asprion, N.: Nonequilibrium Rate-Based Simulation of Reactive Systems: Simulation Model, Heat Transfer, and Influence of Film Discretization, Ind. Eng. Chem. Res. (2006) 45(6), 2054-2069).

The absorption column 2 had a diameter of 3200 mm and comprised an absorption zone 3 comprising two random packings (INTALOX® Metal Tower Packing IMTP 50, Koch-Glitsch, Wichita USA), each having a packing height of 7 meters. The stripper 7 had a diameter of 2300 mm and comprised a regeneration zone 8 comprising two random packings (INTALOX® Metal Tower Packing IMTP 50, Koch-Glitsch, Wichita USA), each having a packing height of 5 meters. The flash tanks 5/24 each had a diameter of 2200 mm and comprised a decompression zone/a desorption zone, each comprising a random packing (INTALOX® Metal Tower Packing IMTP 50, Koch-Glitsch, Wichita USA) having a packing height of 5 meters.

Comparative Example 1

A process was simulated in a plant according to FIG. 1. The acid-gases-laden absorption medium was decompressed into the flash tank 5 to a pressure of 6.2 bar. The temperature of both the gas phase discharged via stream 16 and the absorption medium discharged from the flash tank in a downward direction was 34.6° C. The stripper 7 was operated at a pressure of 1.7 bar. 1.87 t/h of fresh water were supplied via conduit 18.

The energy requirements for the coolers 11 and 15 and for the evaporator 9 and the amount of heat transferred via heat exchanger 19 are reported in table 1. The condensation temperature (cooler 11) was in the customary range and was identical in this example and the remaining examples and comparative examples. The temperature of the stream 13 was consequently also identical in all examples and comparative examples.

Example 2

A process was simulated in a plant according to FIG. 2. The acid-gases-laden absorption medium was decompressed into the flash tank 5 to a pressure of 6.2 bar. The temperature of both the gas phase discharged via stream 16 and the absorption medium discharged from the flash tank in a downward direction was 95.8° C. The stripper was operated at a pressure of 1.7 bar. 1.95 t/h of fresh water were supplied via conduit 18.

The energy requirements for the coolers 11 and 15 and for the evaporator 9 and the amount of heat transferred via heat exchangers 19 and 20 are reported in table 1.

Comparative Example 3

A process was simulated in a plant according to FIG. 3. The acid-gases-laden absorption medium was decompressed into the flash tank 5 to a pressure of 6.2 bar. The temperature of both the gas phase discharged via stream 16 and the absorption medium discharged from the flash tank in a downward direction was 34.6° C. The low-pressure flash tank was operated at a pressure of 1.7 bar and the stripper at a pressure of 1.8 bar. 1.86 t/h of fresh water were supplied via conduit 18.

The energy requirements for the coolers 11 and 15 and for the evaporator 9 and the amount of heat transferred via heat exchanger 19 are reported in table 1.

Example 4

A process was simulated in a plant according to FIG. 4. The acid-gases-laden absorption medium was decompressed into the flash tank 5 to a pressure of 6.2 bar. The temperature of both the gas phase discharged via stream 16 and the absorption medium discharged from the flash tank in a downward direction was 95.8° C. The low-pressure flash tank was operated at a pressure of 1.7 bar and the stripper at a pressure of 1.8 bar. 1.94 t/h of fresh water were supplied via conduit 18.

examples. It is thus possible to remove a greater proportion of $C_5$-$C_8$-hydrocarbons in accordance with the invention.

The $C_5$-$C_8$-hydrocarbons in stream 16 are moreover generated at a pressure of 6.2 bar so that no additional compression outlay is required to send them to the fuel gas system.

In example 4 the output of the evaporator 9 (i.e. the output required for the regeneration) was only 11.4 MW and thus 3.2 to 3.3 MW lower than in the examples 1 to 3. The energy requirements necessitated by cooling were also lower in this example than in the examples 1 to 3. The combination of the inventive procedure with the preheating of the hydrocarbon-depleted laden absorption medium by direct heat exchange with the acid-gas-comprising stream accordingly provides a synergistic effect in terms of energy requirements.

TABLE 2

| stream | | comparative ex. 1 | | example 2 | | comparative ex. 3 | | example 4 | |
|---|---|---|---|---|---|---|---|---|---|
| | | 16 | 13 | 16 | 13 | 16 | 13 | 16 | 13 |
| $CO_2$ | % by volume | 2.5664 | 99.7065 | 75.1282 | 99.9048 | 2.5667 | 99.7066 | 75.1342 | 99.9048 |
| $H_2S$ | % by volume | 0.0011 | 0.0200 | 0.0069 | 0.0209 | 0.0011 | 0.0200 | 0.0070 | 0.0209 |
| $N_2$ | % by volume | 0.5571 | 0.0007 | 0.1359 | 0.0002 | 0.5571 | 0.0007 | 0.1358 | 0.0002 |
| $CH_4$ | % by volume | 93.9195 | 0.2315 | 23.8084 | 0.0539 | 93.9191 | 0.2314 | 23.8026 | 0.0539 |
| $C_2H_6$ | % by volume | 1.6625 | 0.0051 | 0.4304 | 0.0011 | 1.6625 | 0.0051 | 0.4303 | 0.0011 |
| $C_3H_8$ | % by volume | 0.7047 | 0.0022 | 0.1832 | 0.0005 | 0.7047 | 0.0022 | 0.1831 | 0.0005 |
| $C_6H_{14}$ | % by volume | 0.5404 | 0.0027 | 0.1493 | 0.0004 | 0.5404 | 0.0027 | 0.1493 | 0.0004 |
| benzene | % by volume | 0.0156 | 0.0079 | 0.0251 | 0.0063 | 0.0156 | 0.0079 | 0.0251 | 0.0063 |
| toluene | % by volume | 0.0145 | 0.0076 | 0.0386 | 0.0044 | 0.0145 | 0.0076 | 0.0386 | 0.0044 |
| ethylbenzene | % by volume | 0.0092 | 0.0069 | 0.0435 | 0.0031 | 0.0092 | 0.0069 | 0.0435 | 0.0031 |
| o-xylene | % by volume | 0.0090 | 0.0089 | 0.0504 | 0.0044 | 0.0090 | 0.0089 | 0.0504 | 0.0044 |
| flow rate (dry) | m³(STP)/h | 231 | 9999 | 989 | 9241 | 231 | 9999 | 989 | 9241 |
| water | m³(STP)/h | 2 | 508 | 143 | 469 | 2 | 492 | 143 | 455 |
| flow rate (overall) | m³(STP)/h | 233 | 10507 | 1132 | 9711 | 233 | 10491 | 1132 | 9696 |
| flow rate (overall) | kg/h | 184 | 20019 | 1766 | 18520 | 184 | 20006 | 1766 | 18508 |
| temperature | ° C. | 34.6 | — | 95.8 | — | 34.6 | — | 95.8 | — |
| pressure | bar | 6.2 | 1.6 | 6.2 | 1.6 | 6.2 | 1.6 | 6.2 | 1.6 |

The energy requirements for the coolers 11 and 15 and for the evaporator 9 and the amount of heat transferred via heat exchangers 19 and 20 are reported in table 1.

TABLE 1

Energy consumption for cooling, evaporation, heat exchange (unit: MW)

| cooler evaporator/ heat exchanger | comparative ex. 1 | example 2 | comparative ex. 3 | example 4 |
|---|---|---|---|---|
| 9 | 14.7 | 14.7 | 14.6 | 11.4 |
| 11/27* | −6.0 | −5.7 | −0.1 | −2.4 |
| 15* | 0.1** | −0.1** | −5.8 | −0.1** |
| 19 | 20.1 | 3.8 | 14.9 | 4.5 |
| 20 | — | 16.1 | — | 16.1 |

*The energy requirements necessitated by cooling are reported with a negative prefix. In the simulation upon which comparative example 1 is based heat was supplied in 15 (and the prefix is therefore positive).
**This cooler/heat exchanger would be omitted upon practical implementation of the process.

Properties of the streams 16 and 13 for examples 1 to 4 are reported in table 2.

As is evident from table 2, in the inventive examples the volume fraction of the $C_5$-$C_8$-hydrocarbons ($C_6H_{14}$, benzene, toluene, ethylbenzene, o-xylene) in the acid gases withdrawn via stream 13 is lower than in the comparative

The invention claimed is:

1. A process for removing $C_5$-$C_8$-hydrocarbons and acid gases from a fluid stream, the process comprising:
   a) contacting the fluid stream with an absorption medium comprising at least one amine in an absorption zone to obtain a deacidified fluid stream and an acid-gases-laden absorption medium;
   b) heating the laden absorption medium in a first heat exchanger and decompressing the heated laden absorption medium into a decompression zone to a pressure of from 5 to 10 bar to obtain a $C_5$-$C_8$-hydrocarbons-comprising gas phase and a hydrocarbon-depleted laden absorption medium;
   c) passing the hydrocarbon-depleted laden absorption medium into a stripper in which at a pressure of 1 to 2.5 bar the acid gases are at least partially liberated by supplying heat to obtain a regenerated absorption medium and an acid-gas-comprising stream, the hydrocarbon-depleted laden absorption medium being heated in a second heat exchanger before being introduced into the stripper; and
   d) recycling the regenerated absorption medium into the absorption zone,
   wherein:
   before the heating in the second heat exchanger the hydrocarbon-depleted laden absorption medium is decompressed into a desorption zone to a pressure of 1 to 2.5 bar and preheated by direct heat exchange with the acid-gas-comprising stream, the heating medium used in the second heat exchanger is the regenerated absorption medium and the heating medium used in the first heat exchanger is the regenerated absorption medium after it has passed through the second heat exchanger; and the amount of heat transferred in the first heat exchanger is such that the $C_5$-$C_8$-hydrocarbons-comprising gas phase comprises 50% to 97% by volume of acid gases.

2. The process according to claim 1, wherein the fluid stream is brought into contact with the absorption medium in the absorption zone at a pressure of 50 to 80 bar.

3. The process according to claim 1, wherein the partial pressure of the acid gases in the supplied fluid stream is less than 1 bar.

4. The process according to claim 1, wherein the volume fraction of the acid gases in the supplied fluid stream is less than 3.3% by volume.

5. The process according to claim 1, wherein the temperature of the supplied fluid stream is less than 70° C.

6. The process according to claim 1, wherein the $C_5$-$C_8$-hydrocarbons-comprising gas phase comprises 70% to 95% by volume of acid gases.

7. The process according to claim 1, wherein the laden absorption medium heated in the first heat exchanger is decompressed into the decompression zone to a pressure of from more than 6 to 10 bar.

8. The process according to claim 1, wherein the $C_5$-$C_8$-hydrocarbons are at least partially condensed out of the $C_5$-$C_8$-hydrocarbons-comprising gas phase and the uncondensed constituents are passed into the absorption zone.

9. The process according to claim 1, wherein the $C_5$-$C_8$-hydrocarbons comprise at least one aromatic hydrocarbon selected from the group consisting of benzene, toluene, ethylbenzene and xylene.

10. The process according to claim 1, wherein the supplied fluid stream is selected from fluid streams comprising 0.5% to 10% by volume of acid gases and 10 to 5000 ppmv of $C_5$-$C_8$-hydrocarbons.

11. The process according to claim 1, wherein the supplied fluid stream is natural gas.

12. The process according to claim 1, wherein $\varphi$ is less than 1 and $\varphi$ is defined as:

$$\varphi = \frac{\dot{m}_a \cdot c_{pa}}{\dot{m}_f \cdot c_{pf}}$$

where:
$\dot{m}_a$ is the mass flow rate of the absorption medium passed into the absorption zone,
$\dot{m}_f$ is the mass flow rate of the supplied fluid stream,
$c_{pa}$ is the specific heat capacity of the absorption medium passed into the absorption zone, and
$c_{pf}$ is the specific heat capacity of the supplied fluid stream.

13. The process according to claim 1, wherein the amine is a sterically hindered amine or a tertiary amine.

14. The process according to claim 1, wherein the absorption medium further comprises a sterically unhindered primary or secondary amine.

* * * * *